May 14, 1957

U. NISTRI 2,791,935

MULTIPLE PHOTOGRAMMETRICAL PROJECTION MAP PLOTTING APPARATUS

Filed April 7, 1954

INVENTOR
UMBERTO NISTRI

BY Robb+Robb
attorneys

United States Patent Office 2,791,935
Patented May 14, 1957

2,791,935

MULTIPLE PHOTOGRAMMETRICAL PROJECTION MAP PLOTTING APPARATUS

Umberto Nistri, Rome, Italy

Application April 7, 1954, Serial No. 421,586

3 Claims. (Cl. 88—24)

There are the so-called multiple photogrammetric plotting apparatuses with direct optical projection in which the cameras are arranged with their optical main axes in vertical direction along a common horizontal support beam representing the direction of the component BX.

The cameras may be moved independently from each other in order to reconstruct in the space the reciprocal and absolute position corresponding to one of the photograms of the series or the strip of air photography.

The cameras transformed in projection apparatuses are arranged along the said axis and project their images on a horizontal collecting plane which lies below. If the reciprocal and absolute orientation of the various cameras is once reconstructed, the plane of reference becomes the plane of orientation of the resulting optical model.

In order to diminish the known ground points required for the reconstruction of the single optical models, it is necessary to connect the single optical models of each pair of cameras starting from a basis with known points of reference and reaching along the photogrammetric strip to another basis with known points of reference, and reporting then the provisionally assumed vertices along the strip.

The problem present in this case is raised by the necessity of having a sufficient number of projectors available to create the bridge between both the known bases, or to have the possibility to exchange on the common support beam two or more projectors in unchangeable position in order to go on with the said operation.

Since it is sufficient and sometimes necessary to have the greatest possible distance between both bases, and since owing to mechanical reasons not more than 6 or 9 projectors can be arranged on the common beam, it is useful and necessary to have a mechanical arrangement allowing the displacement of one or more pairs of projectors from one end to the other of the said beam without changing their reciprocal and absolute position, i. e. to transfer to the opposite end the projectors which have been utilised so that in them the following photograms of the strip may be arranged.

This invention has the purpose of allowing the said operations easily and surely to be effected in a practical and reliable way, and considering that on the perfect maintenance of the optical model of the cameras arranged depends mainly the good connection of successive photograms.

Figure 1:
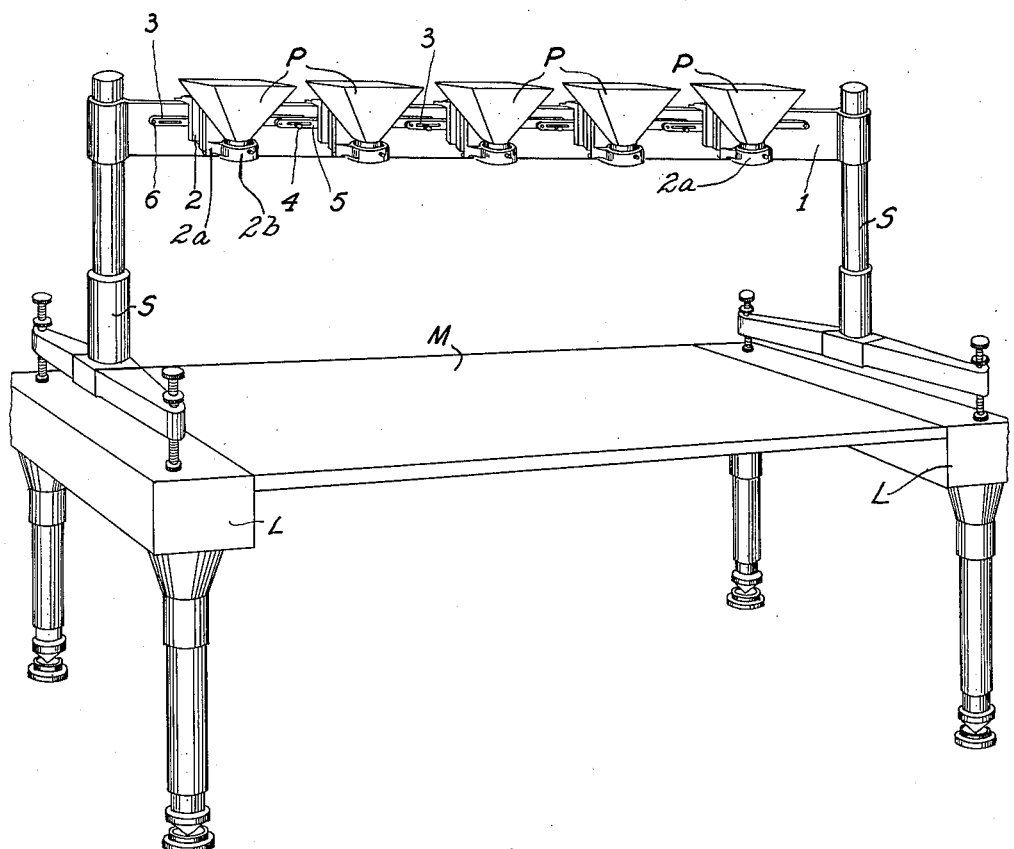
Figure 1 is a perspective view of the apparatus.

On beam 1 representing the direction of the component BX of the basis, five projectors P are arranged each of which is provided with a support 2 which may slide along the support beam 1 so that besides the other components of the basis BY and BZ the projector may take also the inclination and the orientation the corresponding photogram had when it was taken, the single supports 2 are connected with each other by means of mechanical rods 3 projecting sideways. There rods are fixed together by means of buttons 4, while the distance between neighbouring cameras may be varied by means of the slides 5.

Figure 2:
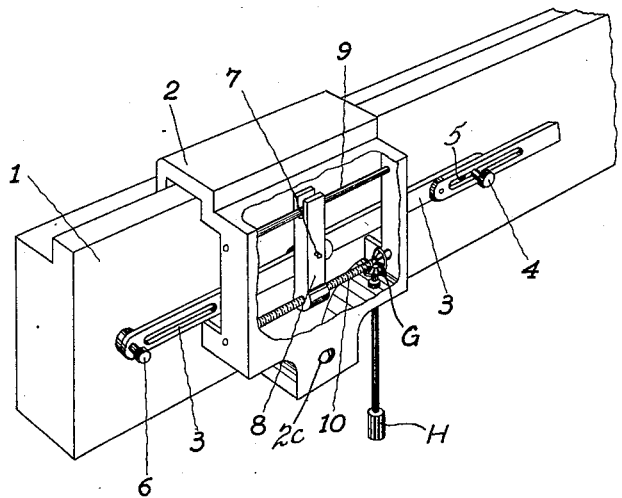
Figure 2 is a fragmentary perspective view of a portion of the beam, certain parts being shown in sections.

Suitably mounted on the supports 2 are projector carrying arms 2a, having demountable connecting portions 2b, the arms being fastened to supports 2 as by means of bolts engaging threaded openings 2c as seen in Figure 2 for example.

The mechanical rods of the projectors P placed at the ends may be fixed in an analogous way to a pivot 6 belonging to the common support beam.

The beam 1 is supported on standards S which are in turn located above leg sections L fixed to opposite ends of a mapping surface M.

The mechanical rods 3 are linked on pivot 7 (Fig. 2) which may be displaced at will by means of support 8 of guide 9 and screw 10 along the component BX by adjusting handle H and miter gears G, thus changing its reciprocal position with respect to the projecting cameras.

Thus there remains unchanged the reciprocal position of pivots 7 connected with each other by means of the mechanical rods 3 and the blocking buttons 4, the component BX of the single cameras may be varied one with respect to the other. At the same time, there is the possibility of eliminating some of the cameras easily and making two or three cameras in pairs slide along after having unlocked the rod fixed to button 6 at each end of the beam, thus leaving unchanged their reciprocal and absolute orientation as well as the distance BX of the component.

What I claim is:

1. In a multiple photogrammetric plotting apparatus comprising, in combination, a plurality of direct optical projection cameras arranged with their optical axes in a vertical direction and arranged along a common horizontal supporting beam, said cameras being adjustably secured to a series of supports slidable thereon, said projectors on said supports, having adjustable means for individually and simultaneously controlling movements of the camera supports along the beam, comprising pivoted arms extending from each support, connections from the arm on at least one support to that of another support, means to removably connect one of the arms to the beam, and adjustable pivoted supporting parts on each support and connected to the arm to give small increments of movement of the support whereby an absolute relative position may be maintained corresponding to one of the photograms of the series strip of air photographs.

2. The combination as claimed in claim 1, wherein the adjustable parts comprise screw adjusting connections with the arms mentioned, and a part is provided to operate such connections.

3. The combination as claimed in claim 1, wherein the controlling means comprise a pair of arms pivotally connected to the support by means of a traversing part, screw means are connected to said part, and at least one of said arms has means for facilitating relative movement of the arm of an adjacent support.

References Cited in the file of this patent

UNITED STATES PATENTS

| | | |
|---|---|---|
| 1,955,116 | Duchatellier | Apr. 17, 1934 |
| 1,980,657 | Bauersfeld | Nov. 13, 1934 |
| 2,079,090 | Von Gruber | May 4, 1937 |
| 2,200,594 | Diggins et al. | May 14, 1940 |
| 2,263,341 | Kurtz | Nov. 18, 1941 |
| 2,461,567 | Pennington | Feb. 15, 1949 |
| 2,625,074 | Nistri | Jan. 13, 1953 |